United States Patent [19]

Perkins

[11] 4,188,619
[45] Feb. 12, 1980

[54] TRANSFORMER ARRANGEMENT FOR COUPLING A COMMUNICATION SIGNAL TO A THREE-PHASE POWER LINE

[75] Inventor: William C. Perkins, Garland, Tex.

[73] Assignee: Rockwell International Corporation, El Segundo, Calif.

[21] Appl. No.: 934,449

[22] Filed: Aug. 17, 1978

[51] Int. Cl.² .......................... H04B 3/54; H04B 3/56
[52] U.S. Cl. .................................... 340/310 R; 323/48
[58] Field of Search ........ 340/310 R, 310 A, 310 CP, 340/538; 179/2.5 R; 178/64; 323/44, 48, 57; 336/182, 180, 192; 333/119, 177; 307/3, 149

[56] References Cited

U.S. PATENT DOCUMENTS

| 1,839,301 | 1/1932 | Duncan | 340/310 R |
| 2,319,633 | 5/1943 | Roseby et al. | 340/310 R |
| 2,647,253 | 7/1953 | Mackenzie et al. | 340/310 R |

FOREIGN PATENT DOCUMENTS

| 490936 | 8/1938 | United Kingdom | 340/310 R |
| 510792 | 8/1939 | United Kingdom | 340/310 R |
| 560943 | 4/1944 | United Kingdom | 340/310 R |
| 729786 | 5/1955 | United Kingdom | 340/310 R |

*Primary Examiner*—John W. Caldwell, Sr.
*Assistant Examiner*—James J. Groody
*Attorney, Agent, or Firm*—Howard R. Greenberg; H. Fredrick Hamann

[57] ABSTRACT

A communication signal is coupled simultaneously to all three phases of a neutral-wye three-phase power line through a transformer arrangement consisting of a low voltage set of three serially connected windings across which the signal is applied to produce the same current in all three windings and a high voltage set of three windings which are connected in a neutral-wye configuration to the power line with a winding of each set being magnetically coupled to a different winding of the other set such that the currents induced in all three windings of the high voltage set flow in the same direction with respect to the neutral connection.

3 Claims, 2 Drawing Figures

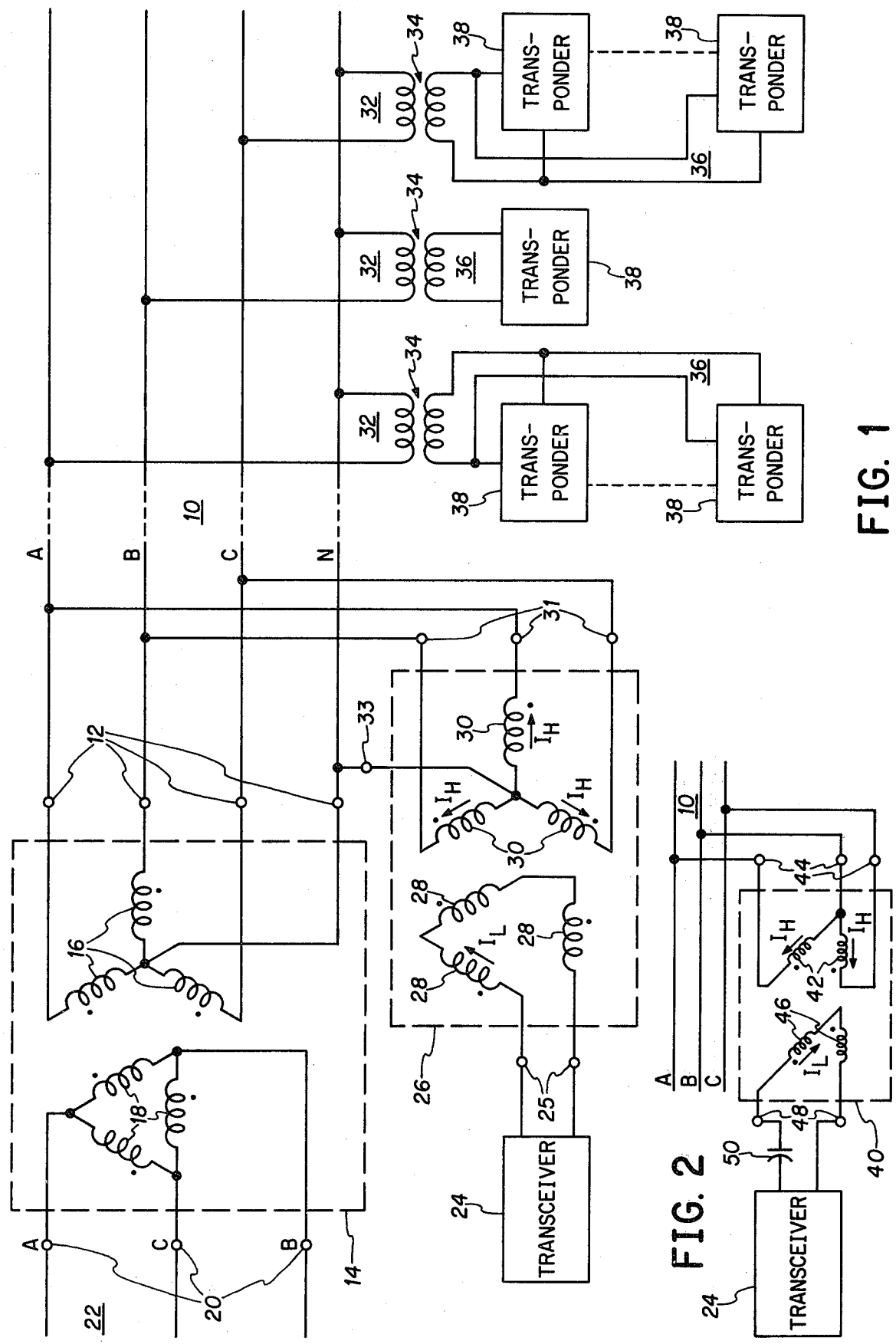

TRANSFORMER ARRANGEMENT FOR COUPLING A COMMUNICATION SIGNAL TO A THREE-PHASE POWER LINE

BACKGROUND OF THE INVENTION

The present invention pertains generally to transmitting communication signals over three-phase power lines and particularly to a transformer arrangement for coupling the communication signals to the power line.

Although the transmission of communication signals over three-phase lines, for example, to monitor and control the electric power system itself, has been successfully addressed heretofore, the need by electric power companies for monitoring and controlling directly customer loads to combat increasingly intractable energy problems has created a need for new and different types of communication techniques. When the power line, itself, is used as a communications medium as an alternative to telephone circuits or radio waves for transmitting data to and from utility customer sites, all of the consumer loads served by a three-phase power distribution feeder are normally monitored and controlled from a central site via the distribution substation which supplies the feeder. Since these customer loads are individually connected between one of the phase conductors and the neutral conductor in a three phase neutral-wye system or between two of the phases in a three wire delta system, the transceiver at the substation for transmitting command signals to the customer loads and receiving monitor signals therefrom must be capable of coupling the signal onto all three phases since the loads are always distributed among the three phases in order to afford a balanced three phase load condition. This coupling may be accomplished by the use of three transceivers, there being one for coupling signals of a much higher frequency than the 60 hertz power frequency to each of the three-phase conductors or, alternatively, a single transceiver which is sequentially connected to the three-phase conductors so that all of the loads respectively connected thereto can be connected to the transceiver for communication purposes. The former approach is not cost effective since it constitutes equipment redundancy while the latter approach entails a switching mechanism which not only adds to the cost and diminishes the reliability of the equipment, but also increases time required for broadcast commands and adversely affects the signal wave which is propagated down the power line. A third alternative is to couple the communication signal to all three phases simultaneously such as described in U.S. Pat. No. 4,065,763, which issued to Whyte, et al. The transformer arrangement depicted therein of a single phase transformer with a multiple tap high voltage winding has notable disadvantages in that unbalanced phase conditions or tap settings result in circulating communication signal currents in the transformer which detracts from efficiency and the operation of the transceiver which is already burdened with translating signals in a difficult environment.

In view of the foregoing, it is a primary object of the present invention to provide a new and improved transformer arrangement for coupling a communication signal simultaneously onto all three phase conductors of a three-phase power line.

It is a further object of the present invention to provide such a new and improved transformer arrangement which is relatively inexpensive and which optimizes the transceiver performance.

The foregoing objects, as well as others, and the means by which they are achieved through the invention herein, may best be appreciated by referring to the Detailed Description Of The Invention which follows hereinafter, together with the accompanying drawing.

BRIEF DESCRIPTION OF THE INVENTION

In accordance with the foregoing stated objects, the present invention entails simultaneously coupling a communication signal to all three phases of a neutral-wye three-phase power line through a transformer arrangement which consists of a low voltage set of three serially connected windings across which the signal is applied to develop the same current in all three windings and a high voltage set of three windings connected in a neutral-wye configuration to the power line, with each winding of one set being magnetically coupled to a different winding of the other set so that currents induced in the high voltage windings flow in the same direction with respect to the neutral connection. This arrangement minimizes transformer circulating currents and assures that the AC three-phase distribution voltages applied across the high voltage windings are not applied to the transceiver equipment by transformer action via the low voltage windings since the three voltages induced therein by the AC distribution voltages are cancelled upon vector addition. A second embodiment of the invention which affords coupling a communication signal simultaneously to all three-phase conductors of a three-phase delta system entails the use of a three-phase open delta transformer with the communication signal being applied across the low voltage pair of windings.

BRIEF DESCRIPTION OF THE FIGURES

FIG. 1 depicts a first embodiment of the invention designed for use with a neutral-wye three-phase power line.

FIG. 2 depicts a second embodiment of the invention designed for use with a delta three-phase power line.

DETAILED DESCRIPTION OF THE INVENTION

As symbolically shown in FIG. 1, a three-phase power distribution line designated generally by the reference numeral 10 consists of three phase conductors A-C and a neutral conductor N. The distribution line 10, which most conventionally would assume a nominal voltage of 12 KV across any two phases thereof, is connected to the output terminals 12 of a three-phase step-down transformer 14 having low voltage windings 16 conventionally arranged in a wye configuration and high voltage windings 18 connected in a delta configuration. High voltage terminals 20 connect the transformer 14 to the high voltage transmission line represented generally by reference numeral 22.

A transceiver 24 is located at the substation for generating and sending command signals to be transmitted via the distribution line 10 to utility customer sites for controlling the loads and functions thereat, as well as for receiving signals from the customer sites in order to monitor the loads. The transceiver 24, which may consist of a separate transmitter and receiver or a single unit integrating both functions, is well known in the art and need not be detailed herein. The transceiver 24 block is intended to denote all of the equipment necessary for generating and modulating a carrier signal of suitable frequency, e.g., 3-10 kHz, for transmission to a customer site over the distribution line 10, demodulating and detecting a carrier signal transmitted from the customer site over the power line 10 and further includes the attendant power supply. The communication signal is coupled to or from the distribution line 10 via low voltage terminals 25 through a transformer arrangement 26 consisting of a set of three like low voltage windings 28 serially connected (in split delta fashion) across which the communication signal is applied or developed so that the same current $I_L$ flows through all three windings 28. A set of three like high voltage windings 30 is connected in a wye configuration to the phases A-C of power line 10 via high voltage terminals 31 with its neutral terminal connected to the neutral conductor N of power line 10 via terminal 33. Each of the windings 30 is magnetically coupled to a different one of the low voltage windings 28 (by virtue of a single, three-phase transformer or three single-phase transformers) so that, as denoted by the conventional dots of FIG. 1, the currents $I_H$ induced in high voltage windings 30 by the current $I_L$ flowing through windings 28 all flow in the same direction with respect to the neutral connection. It is to be noted that, since all three currents, $I_H$, must be equal to one another since they are all proportional to the same current $I_L$ by the same turns ratio (the windings of each set being alike), no circulating currents are developed in the transformer 26 as the possible result of unbalanced phase conditions in the distribution line 10, thus avoiding any signal degradation which would otherwise be caused thereby. Moreover, the low voltage winding split delta arrangement assures that the 60 hertz AC voltages induced in the low voltage windings 28 from the high voltage windings 30 are cancelled when vectorially summed across terminals 25 so that no 60 hertz voltage is applied to transceiver 24 except that due to residual unbalance. This permits the use of low voltage solid state equipmet without the need for artificially blocking the 60 hertz AC such as through a large capacitor.

The utility customer loads are supplied from single phase feeders, generally designated as 32 from the distribution line 10, which are connected to different phases thereof so as to impose on the line 10 an approximately balanced load condition. After the distribution voltage is stepped down to customer utilization voltage, nominally 120/240 volts through distribution transformers 34, the electricity is routed to the various customer sites through low voltage distribution circuits 36. Although the individual customer loads are not pictorially represented in FIG. 1, they would be connected to the low voltage distribution circuits 36 at the same points as are transponders 38, there being an individual transponder 38 provided for each customer site. The transponder 38, which is well known in the art and need not be described in detail herein, responds to the command signals received from transceiver 24 by either effecting some load control function or transmitting back to the transceiver 24 some load information which is being monitored. Accordingly, each transponder 38 is understood to contain a transceiver, itself. Individual transponder control is effectuated by encoding in the command signals the address of the transponder 38 to which the command signal is directed, there being a unique address for each transponder 38. Since the command signals are applied to all three phases A-C of the distribution line 10, it makes no difference which phase the addressed transponder 38 is connected to since it will always receive the signal over one of the three phases. Likewise, since the transceiver 24 receives response signals over all three phases of the distribution line 10, it makes no difference which transponder 38 is transmitting since the signal will be received via the appropriate phase conductor.

In comparison measurements between single-phase and split delta coupling techniques using standard distribution transformers at the substation and measuring between typical substation and residential locations, test data shows the split delta configuration provides 3 dB to 6 dB advantage in transfer impedance in the 3 kHz to 10 kHz ranges. That is, the split delta configuration requires 3 dB to 6 dB less transmitted current to produce the same received signal level in either direction. Thus, the signal levels required for communication are materially reduced through use of the split delta coupling configuration.

Under conditions outlined above, the nominal 120-volt split delta termination presents to the communication transmitter and receiver a power frequency fundamental (60 Hz) level of less than two volts rms as compared to the full 120 volts rms with the single-phase termination. The level of the power frequency third harmonic (180 Hz) is dominant in the split delta termination at typically less than five volts rms. From 3 kHz to 10 kHz, power frequency harmonic levels of the two configurations are comparable and less than one millivolt. Thus, without apparent operational penalty, the problem of blocking and protecting the transmitter and receiver from the power frequency is notably mitigated by the split delta coupling configuration.

An additional benefit of the aforedescribed arrangement is the reduced likelihood that the communication signal applied to the distribution line 10 will interfere with the reception of the communication signal applied to the distribution lines via the high voltage transmission system including transformer 14. This is attributable to equal currents $I_H$ being applied to phase conductors 10A-10C, so that any equal components thereof which pass through the low voltage windings 16 of transformer 14 rather than out onto the line 10 merely induce a circulating current in the high voltage windings 18 which does not get coupled onto transmission line 22 for transmission to other distribution points. Only in the event of an unbalanced impedance condition might some portion of the communication signal be so coupled.

A test at a distribution station showed that under like conditions applying the communication signal to all three phase conductors rather than a single phase thereof resulted in a 3 dB increase in signal attenuation, and consequently reduced cross-talk, as measured at surrounding distribution stations.

It will be readily recognized that the transformer arrangement depicted in FIG. 1 is not suitable for a delta three-phase system. The problem of transmitting communication signals over this type of system is obviated by the transformer arrangement depicted in FIG. 2 wherein a three-phase open delta transformer arrangement 40 consists of two high voltage windings 42 connected in open delta fashion to high voltage terminals 44 while the two low voltage windings 46 are serially connected to low voltage terminals 48 across which the communication signal is applied or developed. Since, in this arrangement, the 60 hertz AC voltages, induced in the low voltage windings are not cancelled out, a capacitor 50 interconnects the transceiver 24 with the transformer arrangement 40 to block the application of high 60 hertz voltage to transceiver 24.

As the foregoing demonstrates, the transformer arrangement of the subject invention allows communication signals to be coupled to and from a power distribution line using transceiving equipment which is of conventional state of the art design, thereby affording cost effectiveness and simplified operation. Since, undoubtedly, modifications to the foregoing embodiments can be made by those skilled in the art without departing from the scope and spirit of the invention, the detailed description herein is intended to be merely exemplary and not circumscriptive of the invention, which will now be claimed hereinbelow.

What is claimed is:

1. A transformer arrangement for simultaneously coupling a signal to all three phase conductors of a three-phase power line having a neutral conductor comprising:
    a low voltage set of three like windings serially connected, with one end of each of two of said windings being disconnected;
    a high voltage set of three like windings connected in a neutral wye configuration to the power line;
    means for magnetically coupling each winding of one set with a different winding of the other set so that a current through said low voltage set of windings causes currents to flow through the windings of said high voltage set in the same direction with respect to the neutral connection, and
    means for applying the signal to be coupled to the power line across the disconnected ends of the two windings of the first set.

2. Signaling apparatus for simultaneously coupling a signal to all three phase conductors of a three-phase power line having a neutral conductor, comprising:
    an AC signaling device having a pair of terminals through which the signal is translated, and
    a transformer having a low voltage set of three like windings serially connected, with one end of each of two of said windings being connected to a different one of said terminals, a high voltage set of three like windings connected in a wye-neutral configuration to the power line and means for magnetically coupling each winding of one set with a different winding of the other set so that a current through said low voltage set of windings causes currents to flow through said high voltage windings in the same direction with respect to the neutral connection.

3. A signaling system, comprising:
    a three-phase power line comprising three phase conductors and a neutral conductor;
    an AC signaling device having a pair of terminals through which the signal is translated; and
    a transformer having a low voltage set of three like windings serially connected, with one end of each of two of said windings being connected to a different one of said terminals, a high voltage set of three like windings connected in a wye-neutral configuration to the power line and means for magnetically coupling each winding of one set with a different winding of the other set so that a current through said low voltage set of windings causes currents to flow through said high voltage windings in the same direction with respect to the neutral connection.

* * * * *